B. J. HARRISON.
Infants' Parlor Wagons.
No. 169,168. Patented Oct. 26, 1875.
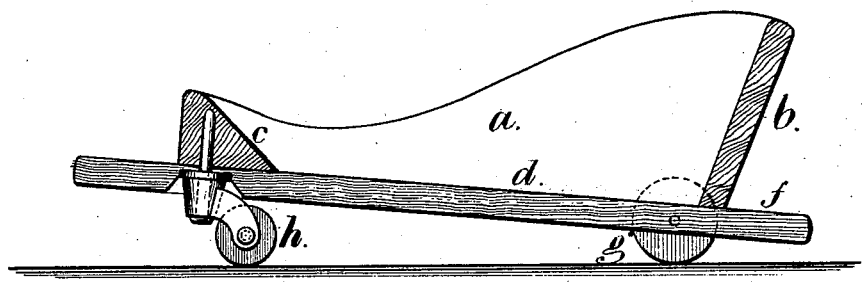
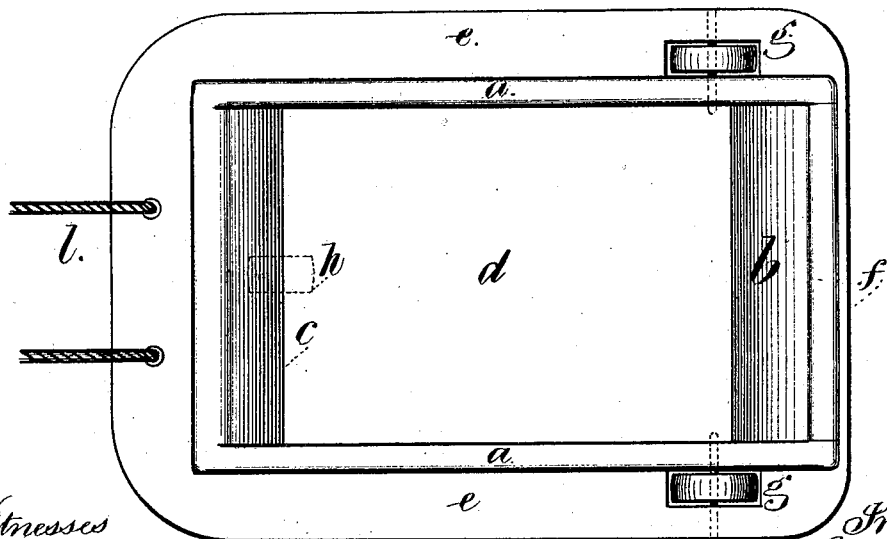

UNITED STATES PATENT OFFICE.

BENJAMIN J. HARRISON, OF NEW YORK, N. Y.

IMPROVEMENT IN INFANTS' PARLOR-WAGONS.

Specification forming part of Letters Patent No. 169,168, dated October 26, 1875; application filed March 23, 1875.

*To all whom it may concern:*

Be it known that I, BENJAMIN J. HARRISON, of the city and State of New York, have invented an Improvement in Infants' Parlor-Wagon, of which the following is a specification:

Wagons for children's use in dwellings have not heretofore been adapted to the circumstances under which they are used. They are liable to injure the furniture. A child, by leaning in one direction or the other, or by seizing an adjacent article, may upset the wagon, and the child's hands and limbs are liable to injury from contact with adjacent objects when the wagon is being drawn around the room.

My invention is made to relieve all these difficulties, and consists in a child's wagon made with a projecting bottom board, forming a fender all around such wagon that is sufficiently near the floor to rest upon the floor if the wagon is tipped sidewise or toward the back, and thereby prevent the wagon tipping over, and at the same time this projecting bottom board forms a fender to prevent contact of the wheels with furniture, to protect the hands and limbs of the child from injury against such furniture, and to insure the general safety of the child.

In the drawing, Figure 1 is a plan of the said wagon, and Fig. 2 is a vertical section of the same.

The body of the wagon is made of the sides $a$, back $b$, and foot-rest $c$, and the bottom $d$ is attached to such body, and projects at the sides and back to form the fenders $e$ $e f$, and the hind wheels $g$ are inserted into mortises in the fenders $e$ $e$, and, by preference, are covered, and the front wheel $h$ is made as a caster—that is, by preference, recessed sufficiently to allow the bottom of the wagon to be but a short distance from the floor. A cord, $l$, attached at the front end of the wagon allows it to be drawn from place to place.

If the weight of the child in this wagon tends to tip the same to the back, or to either side, the fender resting upon the floor prevents further movement, and the inclination is not enough to allow the child to fall out, and the projecting fenders guard the hands and limbs of the child from injury by projecting so far from the body of the wagon that room is left for such hands and limbs should they be outside the body, and the fenders strike any article of furniture.

The edges of the fenders may be covered with india rubber or other yielding material.

I claim as my invention—

The infants' wagon made with the fenders $e$ $e$ and $f$, at the bottom of the body, projecting beyond the wheels, substantially as and for the purposes specified.

Signed by me this 18th day of March, 1875.

B. J. HARRISON.

Witnesses:
 GEO. P. PINCKNEY,
 CHAS. H. SMITH.